United States Patent
Shim et al.

(10) Patent No.: US 8,467,729 B2
(45) Date of Patent: Jun. 18, 2013

(54) METHOD AND APPARATUS FOR ELIMINATING MULTI-USER INTERFERENCE IN MULTI-ANTENNA SYSTEM

(75) Inventors: Sei-Joon Shim, Suwon-si (KR); Eun-Jung Kim, Suwon-si (KR); Jae-Kon Lee, Suwon-si (KR); Sang-Boh Yun, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 381 days.

(21) Appl. No.: 12/717,497

(22) Filed: Mar. 4, 2010

(65) Prior Publication Data
US 2010/0227562 A1 Sep. 9, 2010

(30) Foreign Application Priority Data
Mar. 4, 2009 (KR) .................. 10-2009-0018314

(51) Int. Cl.
*H04B 1/00* (2006.01)
(52) U.S. Cl.
USPC ................ 455/63.1; 455/278.1; 455/522

(58) Field of Classification Search
USPC ................................. 455/63.1, 522
See application file for complete search history.

(56) References Cited

U.S. PATENT DOCUMENTS
2007/0149233 A1* 6/2007 Wang et al. ............ 455/522
2008/0227422 A1 9/2008 Hwang et al.

FOREIGN PATENT DOCUMENTS
KR 1020080068986 7/2008
KR 1020080073432 8/2008
KR 1020080094415 10/2008

\* cited by examiner

*Primary Examiner* — Nguyen Vo
*Assistant Examiner* — Hsin-Chun Liao
(74) *Attorney, Agent, or Firm* — The Farrell Law Firm, P.C.

(57) ABSTRACT

A method and an apparatus are provided for eliminating multi-user interference in a multi-antenna system. In a BS, precoding vector information of at least one interfering user terminal interfering with a user terminal and information about a ratio of the transmission (TX) power of the user terminal to the total TX power of the BS are detected. A control signal including the detected information is transmitted to the user terminal.

14 Claims, 8 Drawing Sheets

METHOD AND APPARATUS FOR ELIMINATING MULTI-USER INTERFERENCE IN MULTI-ANTENNA SYSTEM

PRIORITY

This application claims priority under 35 U.S.C. §119(a) to an application filed in the Korean Intellectual Property Office on Mar. 4, 2009 and assigned Serial No. 10-2009-0018314, the contents of which are incorporated herein by reference.

BACKGROUND OF THE INVENTION

1. Field of the Invention

The present invention relates generally to a method and apparatus for eliminating multi-user interference in a multi-antenna system, and more particularly, to a method and apparatus for eliminating multi-user interference in a multi-user multi-antenna system, which maintain strength against quantization noise and fast fading environments.

2. Description of the Related Art

Due to the rapid growth of the mobile communication market, a variety of wireless multimedia services are required. Research is being conducted to provide high-capacity and high-rate data transmission, and a multi-antenna system (e.g., a Multiple Input Multiple Output (MIMO) system) that can efficiently use limited frequency resources.

In comparison with a single-antenna system, the multi-antenna system can achieve high transmission reliability and a high data rate without the allocation of additional frequency and transmission (TX) power. This is due to the fact that it transmits data by using an independent channel for each antenna. Specifically, the multi-antenna system can improve system performance through a diversity gain and can improve the data rate through a multiplexing gain. The multi-antenna system can also expand to a multi-user multi-antenna system that supports multi-user environments.

The multi-user multi-antenna system can further increase the frequency efficiency because multiple user terminals share spatial resources secured through multiple antennas.

In order to prevent interference between user terminals, a Base Station (BS) of the multi-user multi-antenna system precodes downlink signals prior to transmission to the user terminals. The user terminals acquire their respective information from signals received through their respective channels. For example, the BS may use a Zero Forcing (ZF)-based or Minimum Mean Square Error (MMSE)-based precoding scheme to reduce multi-user interference. The BS may also use a Dirty Paper Coding (DPC)-based or Block Diagonalization (BD)-based precoding scheme to reduce multi-user interference while satisfying system channel capacity. As described above, the BS precodes TX signals to eliminate interference between user terminals that use the same sub-channel.

A scheme that prevents performance degradation caused by a quantization error in the precoding operation is under active discussion. Accordingly, conventional precoding schemes are designed to consider a quantization error in a multi-user multi-antenna system. However, because most of the conventional quantization precoding schemes presupposs slow fading or flat fading, if they are used in fast fading environments caused by mobile stations, performance degradation may occur due to a quantization error caused by the mismatching between a quantization codebook and a channel.

SUMMARY OF THE INVENTION

The present invention has been made to address at least the above-described problems and/or disadvantages and to provide at least the advantages described below. Accordingly, an aspect of the present invention provides a method and apparatus for eliminating multi-user interference in a multi-antenna system.

Another aspect of the present invention provides a method and apparatus for eliminating multi-user interference in a multi-user multi-antenna system, which maintain strength against quantization noise and fast fading environments.

Another aspect of the present invention provides a method and apparatus for a user terminal to eliminate an influence of quantization noise in a multi-user multi-antenna system by whitening interference from another user terminal.

Another aspect of the present invention provides a method and apparatus for a user terminal to estimate an interference correlation matrix of other user terminals in a multi-user multi-antenna system by using precoding matrix information of the other user terminals and a ratio of its TX power to the total BS TX power.

According to one aspect of the present invention, a method is provided for a BS to eliminate multi-user interference in a multi-antenna system. Precoding vector information of at least one interfering user terminal interfering with a user terminal and information about a ratio of a TX power of the user terminal to a total TX power of the BS are detected. A control signal including the precoding vector information and the information about the ratio is transmitted to the user terminal.

According to another aspect of the present invention, a method is provided for a user terminal to eliminate multi-user interference in a multi-antenna system. A control signal including precoding vector information of at least one interfering user terminal and information about a ratio of a TX power of the user terminal to a total TX power of a BS are received from the BS. An interference correlation matrix of the at least one interfering user terminal is estimated by using the precoding vector information and information about the ratio included in the control signal. An interference of the at least one interfering user terminal is whitened by using the interference correlation matrix.

According to an additional aspect of the present invention, an apparatus of a BS is provided for eliminating multi-user interference in a multi-antenna system. The apparatus includes a controller for detecting precoding vector information of at least one interfering user terminal interfering with a user terminal and information about a ratio of a TX power of the user terminal to a total TX power of the BS. The apparatus also includes a transmitter for transmitting a control signal including the precoding vector information and the information about the ratio to the user terminal.

According to a further aspect of the present invention, an apparatus of a user terminal is provided for eliminating multi-user interference in a multi-antenna system. The apparatus includes a receiver for receiving a control signal including precoding vector information of at least one interfering user terminal and information about a ratio of a TX power of the user terminal to a total TX power of a BS from the BS. The apparatus also includes a reception (RX) matrix applier for estimating an interference correlation matrix of the at least one interfering user terminal by using the precoding vector information and the information about the ratio in the control signal, and for whitening an interference of the at least one interfering user terminal by using the interference correlation matrix.

BRIEF DESCRIPTION OF THE DRAWINGS

The above and other aspects, features and advantages of the present invention will become more apparent from the following detailed description when taken in conjunction with the accompanying drawings, in which.

DETAILED DESCRIPTION OF EMBODIMENTS OF THE PRESENT INVENTION

Figure 1:
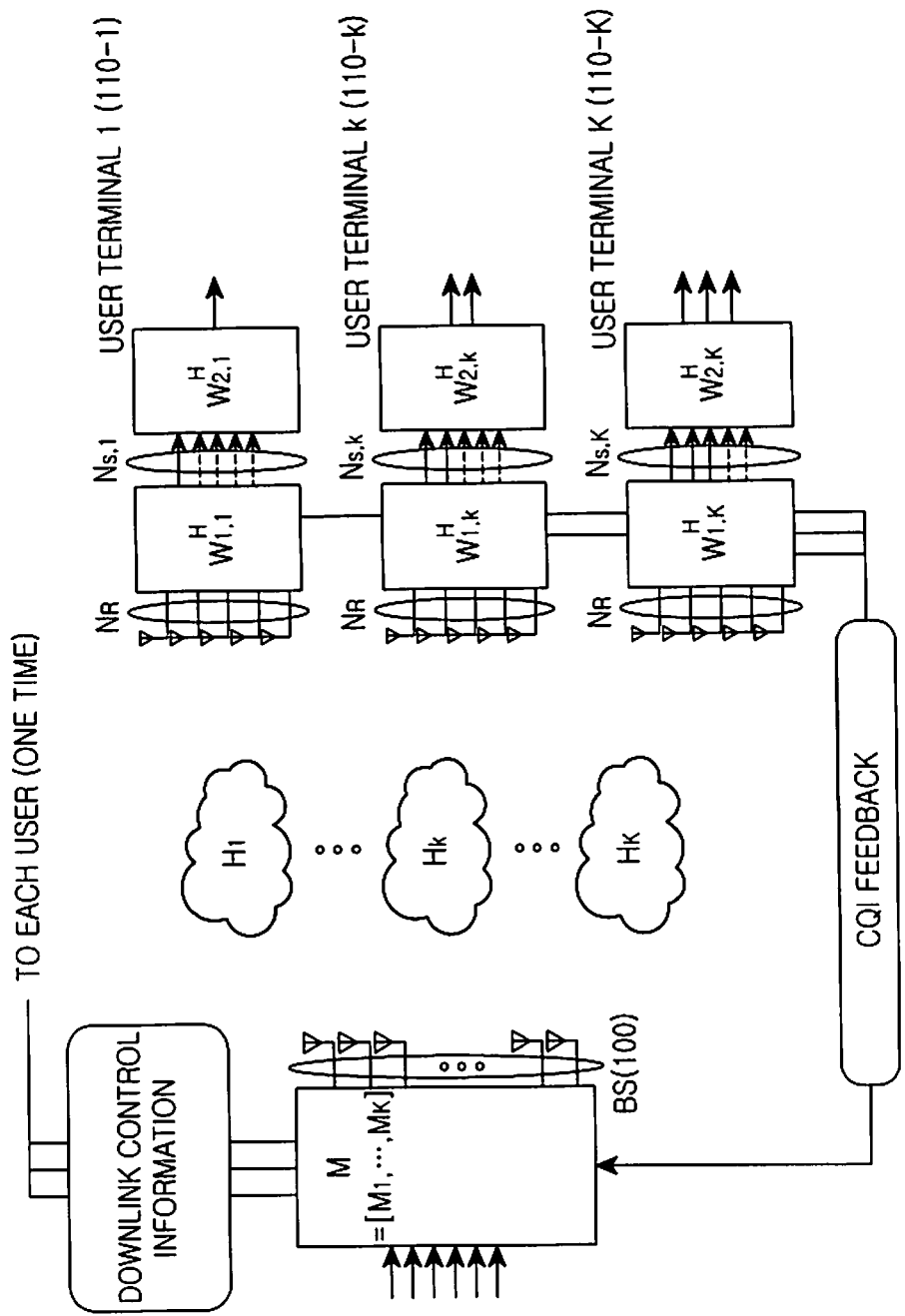
FIG. 1 is a diagram illustrating the structure of a multi-user multi-antenna system, according to an embodiment of the present invention.

Embodiments of the present invention are described in detail herein with reference to the accompanying drawings. In the drawings, the same or similar components may be designated by the same or similar reference numerals, although they are illustrated in different drawings. Further, detailed descriptions of constructions or processes known in the art may be omitted for the sake of clarity and conciseness, and to avoid obscuring the subject matter of the present invention.

The present invention provides a method and apparatus for eliminating multi-user interference in a multi-user multi-antenna system by transmitting information of the precoding matrix of other user terminals and information about a ratio of TX power of a user terminal to a total TX power of a BS, from the BS to the user terminal. Interference correlation matrices of the other user terminals are estimated by the user terminal based on the received information.

FIG. 1 is a diagram illustrating the structure of a multi-user multi-antenna system, according to an embodiment of the present invention.

Referring to FIG. 1, embodiments of the present invention assume that a BS 100 transmits data simultaneously to K user terminals 110-1 to 110-K that use the same subchannel. The BS 100 multiplies a TX signal for each of the user terminals 110-1 to 110-K by a precoding vector, sum the resulting signals, and transmits the summed signal through multiple antennas to each of the user terminals 110-1 to 110-K. The signals transmitted from the BS 100 are received by the user terminals 110-1 to 110-K through the channels that exist between the BS 100 and the user terminals 110-1 to 110-K. Each of the user terminals 110-1 to 110-K may use a reception (RX) matrix ($W_{1,k}$, $W_{2,k}$) for decoding and acquiring the transmitted signal of the BS 100 from the received signal.

A model of a downlink signal received by the user terminal k (110-k) may be expressed as Equation (1) below:

$$y_k = H_k M_k x_k + H_k \sum_{l=1, j \neq k}^{K} m_l x_l + n_k \quad (1)$$
$$= H_k M_k x_k + z_k$$

where $y_k$ denotes a signal received by the user terminal k, $H_k$ denotes the channel between the BS and the user terminal k, $M_k$ denotes a precoding vector or matrix used by the BS to eliminate the interference between the user terminals that use the same subchannel, $x_k$ denotes a signal transmitted from the BS, $m_l$ denotes a precoding vector or matrix of the user terminal l, $x_l$ denotes a signal transmitted from the BS to the user terminal l, $n_k$ denotes a white noise of the user terminal k, and $$z_k \left( = H_k \sum_{l=1, j \neq k}^{K} m_l x_l + n_k \right)$$

denotes the downlink interference and noise caused by other user terminals.

Because the BS 100 does not know exact channel information ($H_1$, $H_2$, ..., $H_K$) about the user terminals 110-1 to 110-K, it transmits a TX vector or matrix $M_k$, which is considered to be suitable (based on Channel Quality Information (CQI) fed back from each of the user terminals 110-1 to 110-K), through the downlink. However, in a quantization precoding operation, because the precoding information of the other user terminals is not included in the nulling space of a downlink channel, an interference caused by quantization noise of the other user terminals occurs on the downlink. Such an interference becomes severe in a fast fading channel.

Accordingly, in an embodiment of the present invention, in order to reduce the degradation of the channel capacity by the quantization noise, each of the user terminals 110-1 to 110-K uses a receiver that estimates an interference correlation matrix by a quantization noise to whiten the interference of another user terminal. Specifically, in an embodiment of the present invention, each of the user terminals 110-1 to 110-K estimates the interference correlation matrix, uses the estimated interference correlation matrix to generate an RX matrix ($W_k$: $W_{1,k}$, $W_{2,k}$) for decoding a received signal, uses the interference correlation matrix to whiten the interference of another user terminal in the received signal, and maximizes the Signal-to-Noise Ratio (SNR) of an RX stream so that each user terminal may acquire a TX signal.

The RX matrix generated using the interference correlation matrix may be expressed as Equations (2) and (3) below.

Equation (2) represents an RX matrix for one transport stream, and Equation (3) represents an RX matrix for a multiple transport stream.

$$W_k = \frac{R_k^{-1/2} H_k m_k}{\|R_k^{-1/2} H_k m_k\|_2} \quad (2)$$

$$W_k = W_{1,k} W_{2,k} \quad (3)$$
$$W_{1,k} = R_k^{-1/2}, \quad W_{2,k} = LSVD(R_{z_k}^{-1/2} H_k)$$

where $W_k$ denotes an RX matrix for decoding, $R_k$ denotes an interference correlation matrix, $H_k$ denotes the channel between the BS and the user terminal k, $m_k$ denotes a precoding vector or matrix for the user terminal k in the BS, $W_{1,k}$ denotes a whitening filter, $W_{2,k}$ denotes a filter maximizing the SNR of an RX signal, and LSVD(.) denotes left singular vectors corresponding to the number of transport streams among the left singular matrix obtained through Singular Value Decomposition (SVD).

When a TX/RX vector or matrix is used as above, the channel capacity may be expressed as Equation (4) below:

$$C = \sum_{k=K'+1}^{K} \log_2 \det\left(1 + \frac{P_T}{K} H_k M_k M_k^H H_k^H R_k^{-1}\right) \quad (4)$$

where $P_T$ denotes the total TX power of the BS, K denotes the number of user terminals receiving a signal from the BS, $H_k$ denotes the channel between the BS and the user terminal k, $M_k$ denotes a precoding vector or matrix used by the BS to eliminate the interference between the user terminals that use the same subchannel, and $R_k$ denotes an interference correlation matrix.

Equations (2) to (4) demonstrate that embodiments of the present invention maintain strength against the influence of a quantization noise by estimating an interference correlation matrix to generate an RX matrix and using the RX matrix to whiten the interference of other user terminals.

Estimating the interference correlation matrix by the user terminal includes: determining an original signal from an RX signal through channel estimation; subtracting the determined original signal from the RX signal through a feedback loop; and performing secondary statistical estimation. However, this estimation method requires a log statistical interval in order to be reliable. Therefore, embodiments of the present invention estimate the interference correlation matrix by using a precoding matrix of another user terminal and a ratio of the TX power of the user terminal to a total TX power of the BS. Specifically, the BS transmits downlink control information including the TX power ratio and the precoding matrix of another user terminal to each user terminal, and the user terminal uses the received information to estimate the interference correlation matrix.

Figure 2:
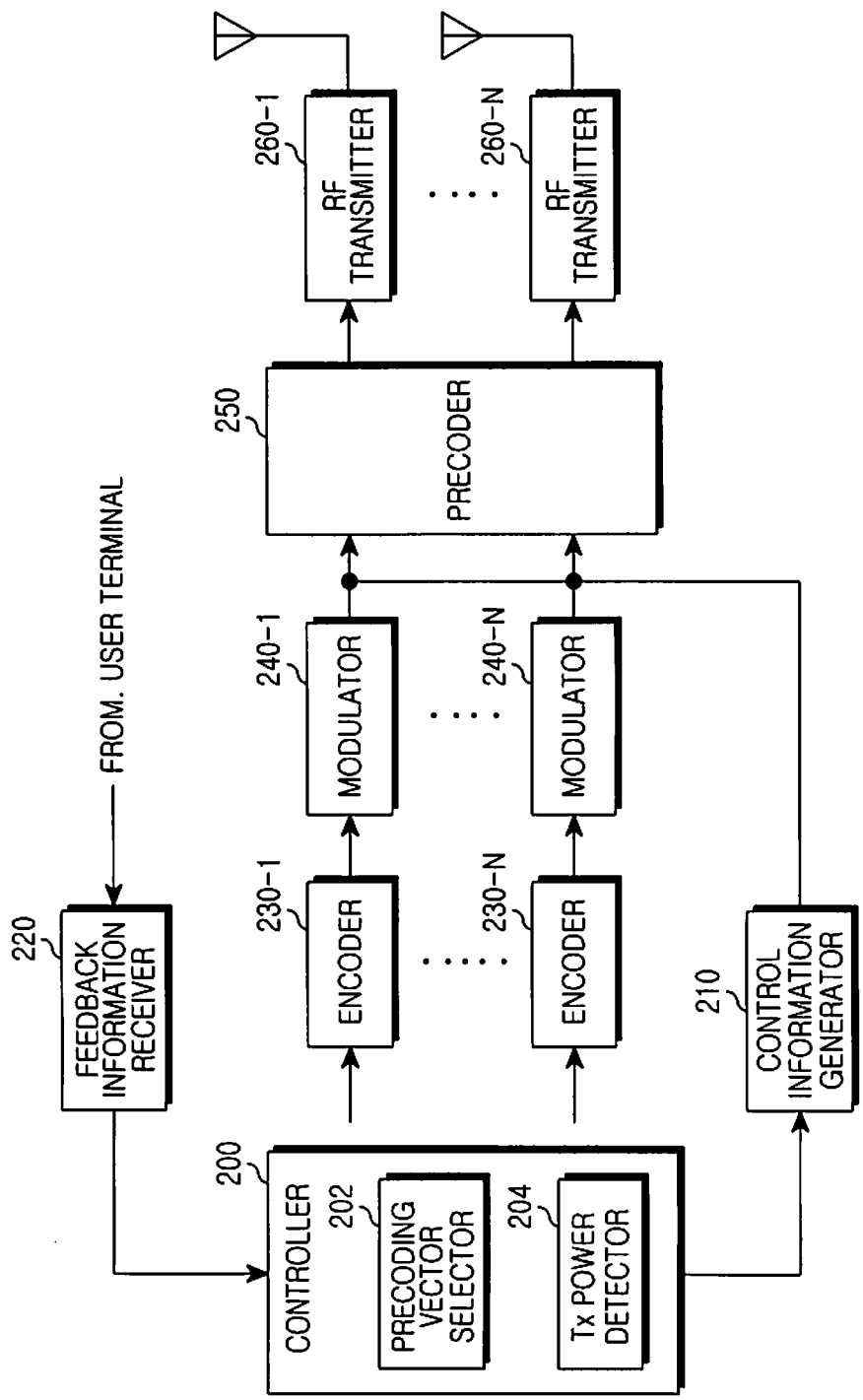
FIG. 2 is a block diagram of a BS in a multi-user multi-antenna system, according to an embodiment of the present invention.

FIG. 2 is a block diagram of a BS in a multi-user multi-antenna system, according to an embodiment of the present invention.

Referring to FIG. 2, the BS includes a controller 200, a control information generator 210, a feedback information receiver 220, a plurality of encoders 230-1 to 230-N, a plurality of modulators 240-1 to 240-N, a precoder 250, and a plurality of Radio Frequency (RF) transmitters 260-1 to 260-N.

The controller 200 includes a precoding vector selector 202 and a TX power detector 204 for generating downlink control information to be transmitted to each user terminal. Specifically, the precoding vector selector 202 selects precoding vectors for user terminals by using the CQI provided from the feedback information receiver 220. The precoding vector selector 202 also provides a precoding matrix, which represents the precoding vectors of other user terminals using the same subchannel as the user terminal, to the control information generator 210. The precoding vector selector 202 may directly transmit codebook indexes, which represent the precoding matrix information of the other user terminal, to the control information generator 210. Also, in order to save the limited downlink resources, the precoding vector selector 202 may tabularize the combinations of codebook indexes as illustrated in FIG. 7 and transmit an index of the table to the control information generator 210 prior to transmission to the corresponding user terminal.

Figure 7:
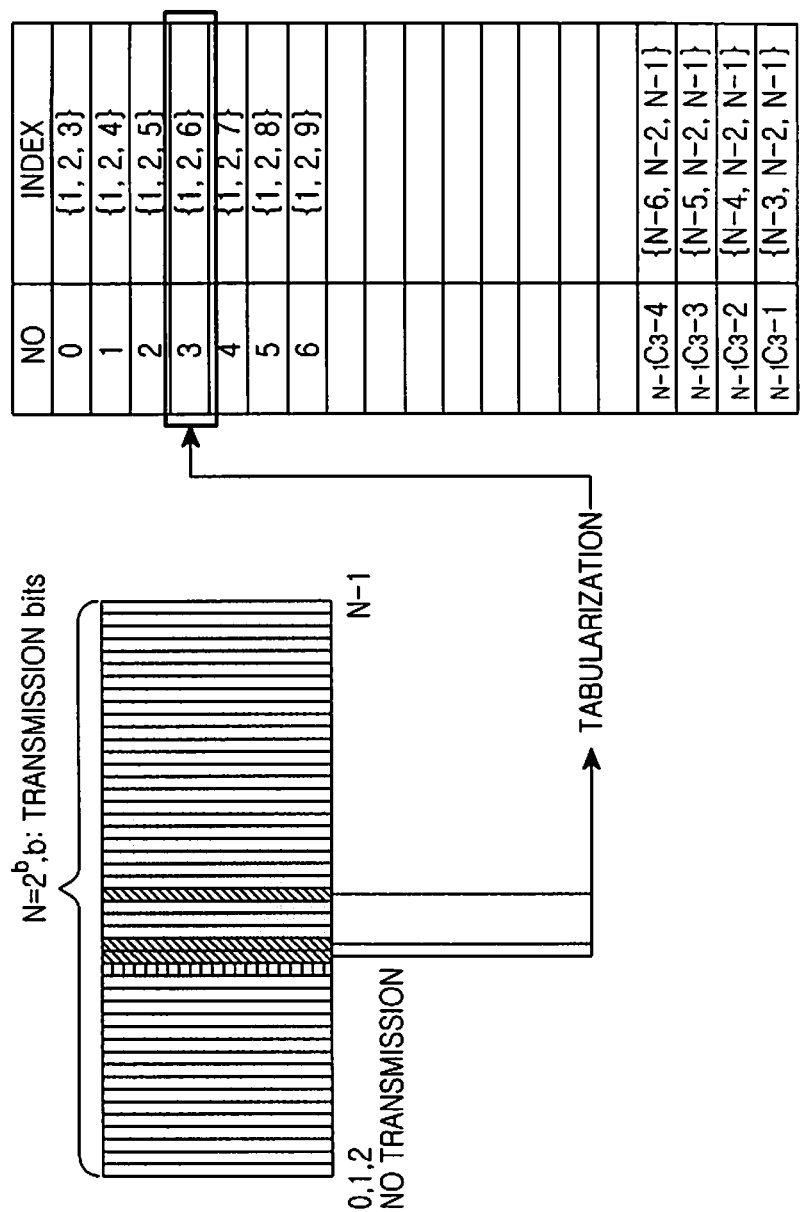
FIG. 7 is a table illustrating codebook combinations in a multi-user multi-antenna system, according to an embodiment of the present invention.

FIG. 7 illustrates an embodiment of tabularizing the combinations of codebook indexes, according to an embodiment of the present invention, on the assumption that different user terminals are not indexed by the same codebook. In FIG. 7, a codebook with indexes 0, 1 and 2 is a codebook with null information, and a scheduler is designed to support a mode of transmission for only one, two or three among four layers. Specifically, FIG. 7 tabularizes three codebook combinations of another user terminal with respect to (N−1) quantization codebooks obtained by subtracting the codebook of the user terminal from N quantization codebooks. The table has a size of $_{N-1}C_3$.

As described above, instead of directly transmitting the codebook indexes representing the precoding matrix of other user terminals, the precoding vector selector 202 transmits an index of the table representing the combinations of the codebook indexes, thereby reducing the number of TX bits as shown in Table 1.

TABLE 1

| | Number of TX Bits | |
|---|---|---|
| N | Transmission of Codebook Index | Transmission of Table Index |
| 16 | 12 | 9 |
| 32 | 15 | 13 |
| 64 | 18 | 16 |
| 128 | 21 | 19 |

Referring to Table 1, regarding a codebook with a size of 16, while a method of transmitting a codebook index of each user terminal requires 12 TX bits, a method of tabularizing the combinations of codebook indexes and transmitting the table index according to the present invention requires 9 TX bits, thus resulting in a reduction of 3 bits.

The TX power detector 204 detects the total TX power ($P_T$) of the user terminals using the same subchannel and the TX power ($P_d$) of the user terminal. The TX power detector provides the ratio ($P_d/P_T$) of the TX power of the user terminal to the total TX power to the control information generator 210.

The control information generator 210 receives the information from the controller 200 and generates a control signal including control information to be transmitted to each user terminal. Specifically, the control information generator 210 generates a control signal including the codebook indexes (i.e., the table index), which represent the precoding matrix of the other user terminals, and information about the ratio ($P_d/P_T$) of the TX power of the user terminal to the total TX power of the BS.

The feedback information receiver 220 interprets a control signal fed back from each user terminal, detects information included in the control signal, and provides the detected information to the controller 200.

Each of the encoders 230-1 to 230-N encodes data to be transmitted through the corresponding stream. Each of the modulators 240-1 to 240-N modulates the encoded data, which is to be transmitted through the corresponding stream, into complex symbols. The precoder 250 multiplies a TX signal of each user terminal by a precoding vector of each user terminal and sums the resulting signals. Each of the RF transmitters 260-1 to 260-N converts each antenna signal, received from the precoder 250, into an RF signal and transmits each RF signal through each TX antenna.

Figure 3:
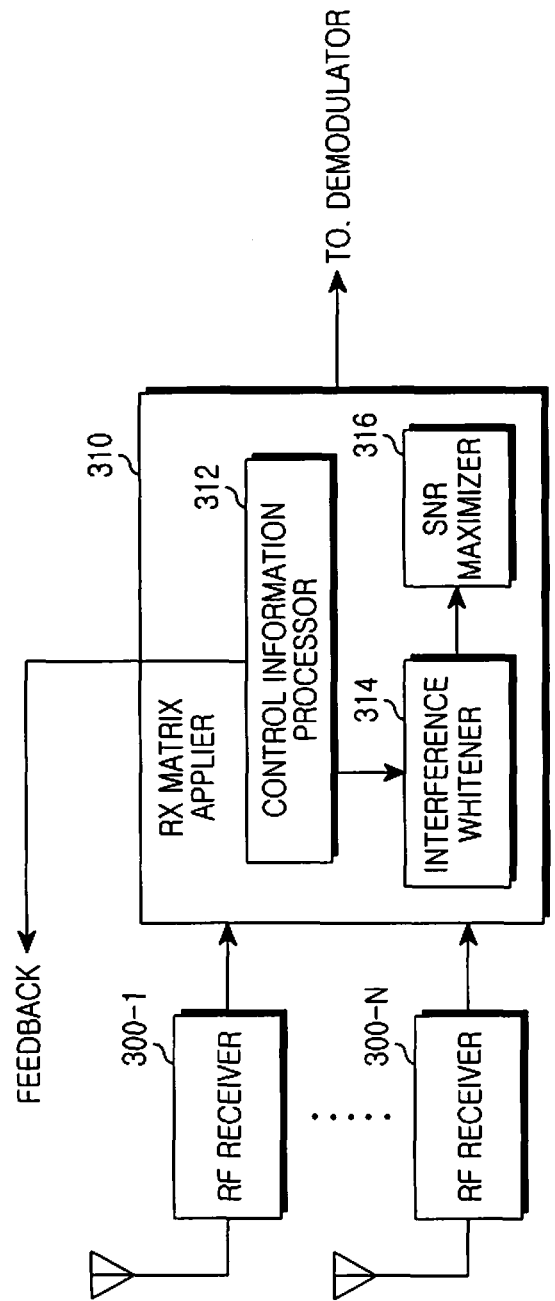
FIG. 3 is a block diagram of a user terminal in a multi-user multi-antenna system, according to an embodiment of the present invention.

FIG. 3 is a block diagram of a user terminal in a multi-user multi-antenna system, according to an embodiment of the present invention.

Referring to FIG. 3, the user terminal includes a plurality of RF receivers 300-1 to 300-N and an RX matrix applier 310. The RX matrix applier 310 includes a control information processor 312, an interference whitener 314, and an SNR maximizer 316.

Each of the RF receivers 300-1 to 300-N converts each RF signal, which is received through each RX antenna, into a baseband signal and provides the baseband signals to the RX matrix applier 310.

The RX matrix applier 310 uses control information, received from the BS, to estimate the interference correlation matrix of other user terminals by a quantization noise. The RX matrix applier 310 generates an RX matrix on the basis of the estimated interference correlation matrix to whiten the interference of another user terminal, and maximizes the SNR of an RX stream of each user terminal to acquire a TX signal.

Specifically, the RX matrix applier 310 uses the control information processor 312 to generate a control signal including control information to be provided to the BS, and interprets a control signal received from the BS to acquire control information. The control information processor 312 analyzes the control signal received from the BS to acquire the codebook indexes (i.e., the table index), which represent the precoding matrix of other user terminals using the same subchannel as the user terminal, and information about the ratio $(P_d/P_T)$ of the TX power of the user terminal to the total TX power of the BS. The RX matrix applier 310 may prestore a table representing the combinations of codebook indexes or receive the same from the BS, thereby detecting the precoding matrix information of other user terminals through the table index included in the control signal.

The RX matrix applier 310 uses the acquired control information to estimate an interference correlation matrix through Equation (5) and uses the estimated interference correlation matrix to generate an RX matrix as shown in Equations (2) and (3).

Equation (5) represents an interference correlation matrix estimation method.

$$R_k = E\{z_k z_k^H\} \quad (5)$$

$$= E\left\{\left(H_k \sum_{l=1,l\neq k}^{K} m_l x_l + n_k\right)\left(H_k \sum_{l=1,l\neq k}^{K} m_l x_l + n_k\right)^H\right\}$$

$$= (P_l + \sigma_n^2) H_k \tilde{M}_k \tilde{M}_k^H H_k^H$$

$$= P_d\left(\frac{P_T}{P_d} - 1 + \frac{1}{\rho}\right) H_k \tilde{M}_k \tilde{M}_k^H H_k^H$$

where $R_k$ denotes an interference correlation matrix of the user terminal k, $E\{\ \}$ denotes an average operator, $z_k$ denotes an interference and noise matrix, $H_k$ denotes the channel between the BS and the user terminal k, $m_l$ denotes a precoding vector or matrix of the user terminal l, $x_l$ denotes a signal transmitted from the BS to the user terminal l, $n_k$ denotes a white noise of the user terminal k, $P_1$ denotes the sum power of interference user terminals, $\tilde{M}_k$ denotes the precoding matrix information of other user terminals for the user terminal k, $P_d$ denotes the TX power of a signal transmitted from the BS to the user terminal, $P_T$ denotes the total TX power of the BS, and $\rho$ denotes a power-to-noise ratio of the user terminal.

Referring to Equation (5), the RX matrix applier 310 acquires the codebook indexes (i.e., the table index), which represent the precoding matrix $\tilde{M}_k$ of other user terminals using the same subchannel as the user terminal, and information about the ratio $(P_d/P_T)$ of the TX power of the user terminal to the total TX power of the BS from the control signal received from the BS, thereby estimating the interference correlation matrix for other user terminals.

The RX matrix applier 310 uses the estimated interference correlation matrix to generate an RX matrix $(W_k: W_{1,k}, W_{2,k})$ as in Equations (2) and (3), uses the interference whitener 314 to whiten the interference of the other user terminals, and uses the SNR maximizer 316 to maximize the SNR of an RX stream for each user terminal, thereby acquiring a TX signal.

Figure 4:
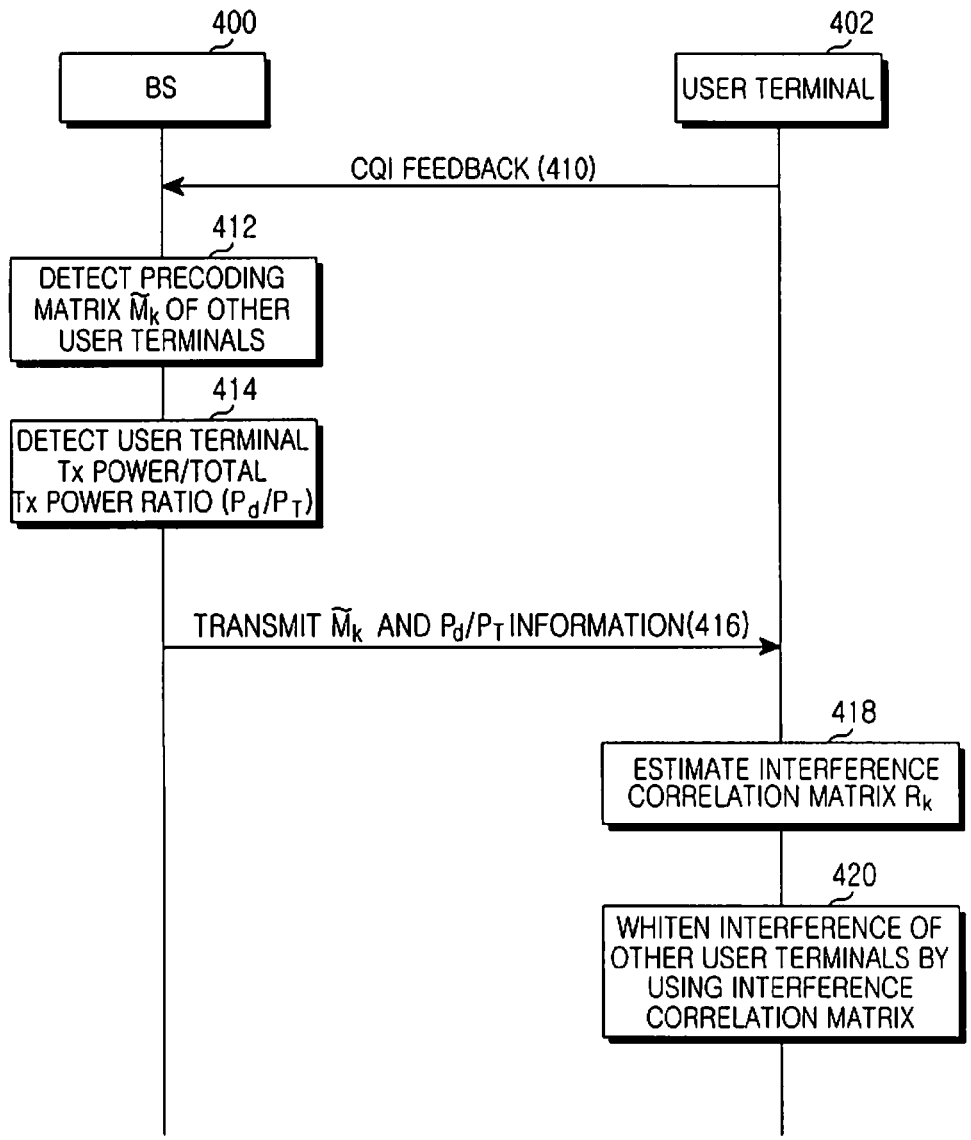
FIG. 4 is a flow diagram illustrating a signal flow between a BS and a user terminal in a multi-user multi-antenna system, according to an embodiment of the present invention.

FIG. 4 is a flow diagram illustrating a signal flow between a BS and a user terminal in a multi-user multi-antenna system, according to an embodiment of the present invention.

Referring to FIG. 4, a user terminal 402 feeds CQI back to a BS 400 in step 410. Upon receiving the CQI, the BS 400 selects a precoding vector for the user terminal 402. In step 412, the BS 400 detects a precoding matrix $\tilde{M}_k$ representing the precoding vector of other user terminals using the same subchannel as the user terminal 402. In step 414, the BS 400 detects the ratio $(P_d/P_T)$ of the TX power of the user terminal 402 to the total TX power of the user terminals using the same subchannel. In step 416, the BS 400 transmits the detected information to the user terminal 402. The BS 400 may transmit codebook indexes in order to transmit the precoding matrix information of other user terminals to the user terminal, or may tabularize the combinations of the codebook indexes and transmit the table index in order to reduce the number of TX bits.

In step 418, the user terminal 402 estimates the interference correlation matrix of the other user terminals as shown in Equation (5) on the basis of the information $(\tilde{M}_k, P_d/P_T)$ received from the BS 400. In step 420, the user terminal 402 uses the estimated interference correlation matrix to generate an RX matrix as in Equations (2) and (3) to whiten the interference of the other user terminals, thereby acquiring a signal transmitted from the BS.

Figure 5:
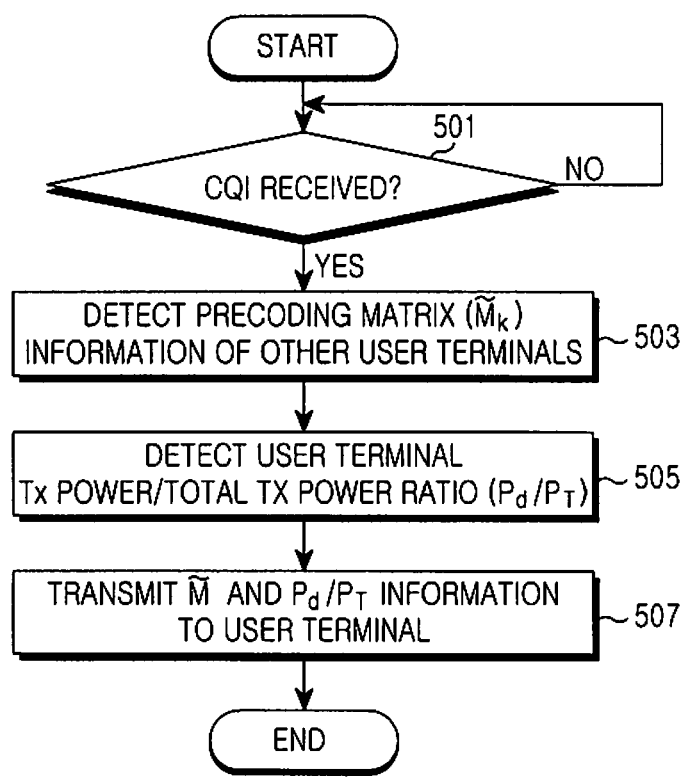
FIG. 5 is a flow chart illustrating an operation process of a BS in a multi-user multi-antenna system, according to an embodiment of the present invention.

FIG. 5 is a flow chart illustrating an operation process of a BS in a multi-user multi-antenna system, according to an embodiment of the present invention.

Referring to FIG. 5, the BS determines if CQI is received from a user terminal in step 501. In step 503, when the CQI is received, the BS detects precoding matrix $(\tilde{M}_k)$ information of other user terminals using the same subchannel as the user terminal transmitting the CQI. In step 505, the BS detects the ratio $(P_d/P_T)$ of the TX power of the user terminal to the total TX power of the other user terminals using the same subchannel.

In step 507, the BS transmits the detected information, i.e., the precoding matrix $(\tilde{M}_k)$ information of the other user terminals and the information about the ratio $(P_d/P_T)$ of the TX power of the user terminal to the total TX power of the BS. The BS may transmit codebook indexes in order to transmit the precoding matrix information of other user terminals to the user terminal, or may tabularize the combinations of the codebook indexes and transmit the table index in order to reduce the number of TX bits.

Thereafter, the BS ends the operation process according to an embodiment of the present invention.

Figure 6:
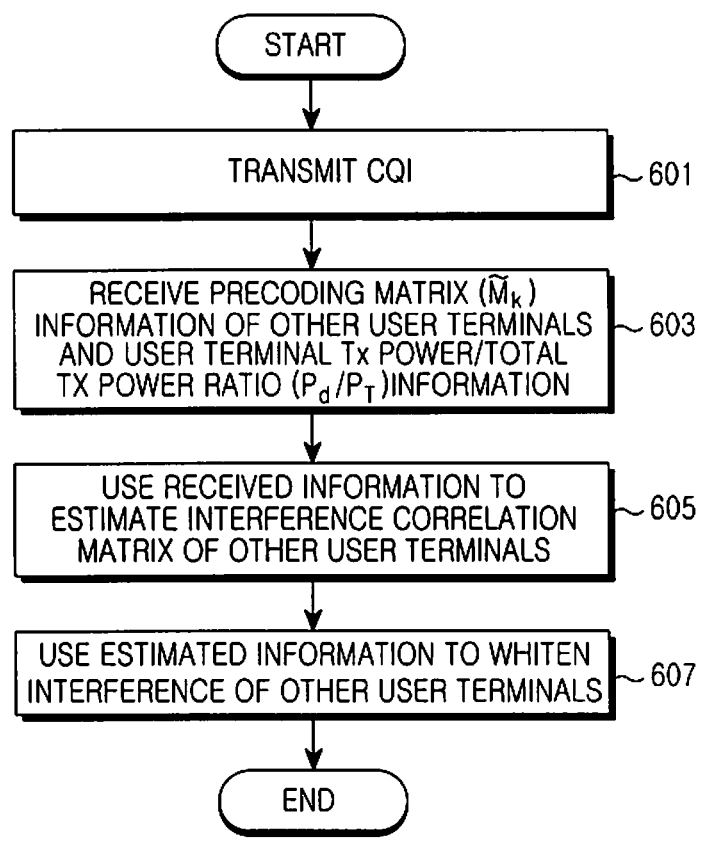
FIG. 6 is a flow chart illustrating an operation process of a user terminal in a multi-user multi-antenna system, according to an embodiment of the present invention.

FIG. 6 is a flow chart illustrating an operation process of a user terminal in a multi-user multi-antenna system, according to an embodiment of the present invention.

Referring to FIG. 6, the user terminal transmits CQI to a base station in step 601. In step 603, the user terminal receives the precoding matrix information ($\tilde{M}_k$) of the other user terminals using the same subchannel as the user terminal and the information about the ratio ($P_d/P_T$) of the TX power of the user terminal to the total TX power of the BS from the BS. Instead of receiving a control signal including codebook indexes from the BS, the user terminal may receive a table index representing the combinations of the codebook indexes to acquire the precoding matrix information of the other user terminals. The user terminal may prestore a table representing the combinations of codebook indexes or receive the same from the BS, thereby detecting the precoding matrix information of the other user terminals through the table index included in the control signal.

In step 605, the user terminal uses the received information to estimate an interference correlation matrix in accordance with Equation (5). In step 607, the use r terminal uses the estimated interference correlation matrix to generate an RX matrix as in Equations (2) and (3), and multiplies the RX signal by the RX matrix to whiten the interference of the other user terminals, thereby acquiring a signal transmitted from the BS.

Thereafter, the user terminal ends the operation process according to an embodiment of the present invention.

Figure 8:
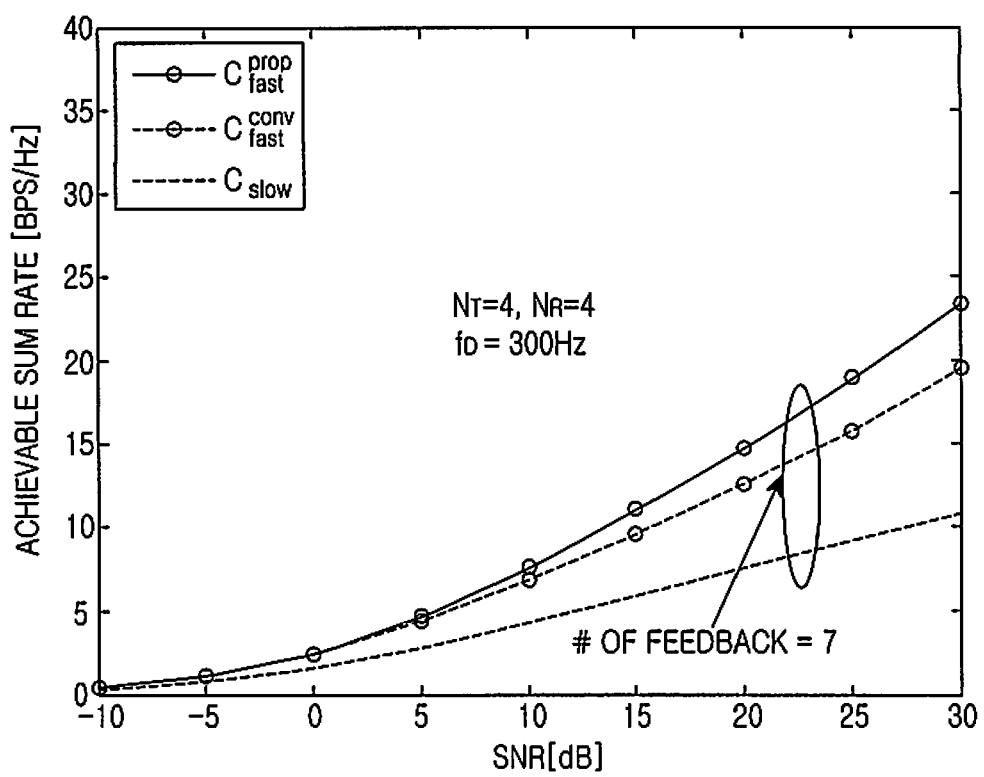
FIG. 8 is a graph illustrating the performances of conventional systems and the performance of the system according to an embodiment of the present invention.

FIG. 8 is a graph illustrating the performances of conventional systems and the performance of the system according to an embodiment of the present invention.

FIG. 8 is a graph illustrating the results of a simulation for measuring the SNR-dependent data rates of conventional systems and the system according to an embodiment of the present invention. In the simulation, it is assumed that a Doppler frequency is 300 Hz, the number of TX antennas of a BS is 4 and the number of RX antennas of each user terminal is 4. Herein, $C_{fast}^{prop}$ represents the performance of the system that feeds back a precoding vector of an interference user terminal according to an embodiment of the present invention, $C_{fast}^{conv}$ represents the performance of a conventional system that uses a reference signal to estimate an interference correlation matrix, and $C_{slow}$ represents the performance of a conventional system that allows an error between a channel and a quantization codebook.

It can be seen from FIG. 8 that the system of the embodiment of the present invention provides higher performance than the conventional systems $C_{fast}^{conv}$ and $C_{slow}$, as the SNR increases, if the system feedback bits are 7 bits.

According to embodiments of the present invention described above, in the multi-user multi-antenna system, the BS transmits the precoding matrix information of other user terminals and the information about the ratio of the TX power of the user terminal to the total TX power to the user terminal. The user terminal uses the received information to estimate the interference correlation matrix of the other user terminals to whiten the interference of another user terminal, thereby eliminating the influence of a quantization noise. Also, the codebook index information of all interference user terminals is tabularized and the table index is transmitted simultaneously with the transmission of the precoding matrix information, thereby saving the resources of a downlink control channel.

While the invention has been shown and described with reference to certain embodiments thereof, it will be understood by those skilled in the art that various changes in form and detail may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method, at a user terminal, for eliminating multi-user interference in a multi-antenna system, comprising the steps of:
receiving a control signal comprising precoding vector information of at least one interfering user terminal and information about a ratio of a transmission (TX) power of the user terminal to a total TX power of a Base Station (BS) from the BS;
estimating an interference correlation matrix of the at least one interfering user terminal by using the precoding vector information and the information about the ratio in the control signal; and
whitening an interference of the at least one interfering user terminal by using the interference correlation matrix.

2. The method of claim 1, wherein the at least one interfering user terminal uses the same subchannel as the user terminal.

3. The method of claim 1, wherein the control signal comprises an index of a table representing combinations of codebook indexes or a codebook index corresponding to a precoding matrix representing a precoding vector of the at least one interfering user terminal.

4. The method of claim 1, wherein the interference correlation matrix is estimated using the following equation:

$$R_k = E\{z_k z_k^H\}$$
$$= P_d\left(\frac{P_T}{P_d} - 1 + \frac{1}{\rho}\right)H_k \tilde{M}_k \tilde{M}_k^H H_k^H$$

where $R_k$ denotes an interference correlation matrix of a user terminal k, E{ } denotes an average operator, $z_k$ denotes a downlink interference and noise by the at least one interfering user terminal, $P_d$ denotes the TX power of the user terminal, $P_T$ denotes the total TX power of the BS, $\rho$ denotes a power-to-noise ratio of the user terminal, $H_k$ denotes a channel between the BS and the user terminal k, and $\tilde{M}_k$ denotes the precoding matrix information of the at least one interfering user terminal for the user terminal k.

5. The method of claim 1, wherein whitening the interference of the at least one interfering user terminal comprises:
generating a reception (RX) matrix corresponding to a number of transport streams by using the interference correlation matrix; and
multiplying an RX signal by the RX matrix.

6. The method of claim 5, wherein, when there is a single transport stream, the RX matrix is generated using the following equation:

$$W_k = \frac{R_k^{-1/2} H_k m_k}{\|R_k^{-1/2} H_k m_k\|_2}$$

where $W_k$ denotes the RX matrix for decoding, $R_k$ denotes the interference correlation matrix, $H_k$ denotes a channel between the BS and the user terminal k, and $m_k$ denotes a precoding vector or matrix for the user terminal k.

7. The method of claim 5, wherein, when there are two or more transport streams, the RX matrix is generated using the following equation:

$$W_k = W_{1,k} W_{2,k}$$

$$W_{1,k} = R_k^{-1/2}, \quad W_{2,k} = \text{LSVD}(R_{z_k}^{-1/2} H_k)$$

where $W_k$ denotes the RX matrix for decoding, $W_{1,k}$ denotes a whitening filter, $W_{2,k}$ denotes a filter maximizing a Signal-to-Noise Ratio (SNR) of an RX signal, $R_k$ denotes the interference correlation matrix, LSVD(.) denotes left singular vectors corresponding to a number of transport streams among a left singular matrix obtained through Singular Value Decomposition (SVD), and $H_k$ denotes a channel between the BS and the user terminal k.

8. An apparatus of a user terminal for eliminating multi-user interference in a multi-antenna system, comprising:
  a receiver for receiving a control signal comprising precoding vector information of at least one interfering user terminal and information about a ratio of a transmission (TX) power of the user terminal to a total TX power of a Base Station (BS) from the BS; and
  a reception (RX) matrix applier for estimating an interference correlation matrix of the at least one interfering user terminal by using the precoding vector information and the information about the ratio in the control signal, and whitening an interference of the at least one interfering user terminal by using the interference correlation matrix.

9. The apparatus of claim 8, wherein the at least one interfering user terminal uses the same subchannel as the user terminal.

10. The apparatus of claim 8, wherein the control signal comprises an index of a table representing combinations of codebook indexes or a codebook index corresponding to a precoding matrix representing a precoding vector of the at least one interfering user terminal.

11. The apparatus of claim 8, wherein the interference correlation matrix is estimated using the following equation:

$$R_k = E\{z_k z_k^H\}$$

$$= P_d \left( \frac{P_T}{P_d} - 1 + \frac{1}{\rho} \right) H_k \tilde{M}_k \tilde{M}_k^H H_k^H$$

where $R_k$ denotes an interference correlation matrix of a user terminal k, E{ } denotes an average operator, $z_k$ denotes a downlink interference and noise by the at least one interfering user terminal, $P_d$ denotes the TX power of the user terminal, $P_T$ denotes the total TX power of the BS, $\rho$ denotes a power-to-noise ratio of the user terminal, $H_k$ denotes a channel between the BS and the user terminal k, and $\tilde{M}_k$ denotes the precoding matrix information of the at least one interfering user terminal for the user terminal k.

12. The apparatus of claim 8, wherein the RX matrix applier generates an RX matrix corresponding to a number of transport streams by using the interference correlation matrix, and multiplies an RX signal by the RX matrix.

13. The apparatus of claim 12, wherein, when there is a single transport stream, the RX matrix is generated using the following equation:

$$W_k = \frac{R_k^{-1/2} H_k m_k}{\| R_k^{-1/2} H_k m_k \|_2}$$

where $W_k$ denotes the RX matrix for decoding, $R_k$ denotes the interference correlation matrix, $H_k$ denotes a channel between the BS and the user terminal k, and $m_k$ denotes a precoding vector or matrix for the user terminal k.

14. The apparatus of claim 12, wherein, when there are two or more transport streams, the RX matrix is generated using the following equation:

$$W_k = W_{1,k} W_{2,k}$$

$$W_{1,k} = R_k^{-1/2}, \quad W_{2,k} = \text{LSVD}(R_{z_k}^{-1/2} H_k)$$

where $W_k$ denotes the RX matrix for decoding, $W_{1,k}$ denotes a whitening filter, $W_{2,k}$ denotes a filter maximizing a Signal-to-Noise Ratio (SNR) of an RX signal, $R_k$ denotes the interference correlation matrix, LSVD(.) denotes left singular vectors corresponding to a number of transport streams among a left singular matrix obtained through Singular Value Decomposition (SVD), and $H_k$ denotes a channel between the BS and the user terminal k.

* * * * *